Feb. 17, 1970  TOMOMITSU IIZUMI  3,495,619
REDUCING VALVE

Filed March 23, 1966  2 Sheets-Sheet 1

TOMOMITSU IIZUMI,
INVENTOR.

BY Hall & Wright

TOMOMITSU IIZUMI,
INVENTOR.

United States Patent Office 3,495,619
Patented Feb. 17, 1970

3,495,619
REDUCING VALVE
Tomomitsu Iizumi, Tokyo-to, Japan, assignor to Shoketsu Kinzoku Kogyo Kabushiki Kaisha, Tokyo-to, Japan
Filed Mar. 23, 1966, Ser. No. 536,781
Claims priority, application Japan, Oct. 22, 1965, 40/64,915
Int. Cl. F16k *31/36;* G05d *11/00, 7/00*
U.S. Cl. 137—489.5        9 Claims

ABSTRACT OF THE DISCLOSURE

A pressure regulator in which a drop in the set outlet pressure acting against a spring biased diaphragm allows the spring biased diaphragm to open a spring biased pilot valve to admit inlet pressure to a piston back chamber to open the main valve. When the outlet pressure reaches the set value, then the outlet pressure raises the diaphragm sufficiently to allow the spring biased pilot valve to close, and restricted venting of the back chamber allows a spring bias to close the main valve. In the illustrative embodiment the back chamber is vented to the outlet chamber and no loss of fluid occurs unless the pressure in the outlet chamber attains a value greater than that set by the adjusting handle (e.g. if the setting of the handle is lowered) in which event a diaphragm vent port is opened for a sufficient period to establish the set pressure value in the said outlet chamber. Provisions are made which simplify the valve and piston assembly and the pilot valve assembly.

---

The present invention relates to a pilot type pressure reducing valve, wherein a cylinder is formed above a primary chamber communicating with a high pressure side and a pressure supply opening establishing communication between the primary and secondary chambers is formed below the primary chamber, the upper cylinder having a piston fitted therein, the lower communicating opening having a master valve provided therein, said piston and master valve being opposed to each other and interconnected through a bar, the pressure-working area of said piston and master valve in the primary chamber being equal to each other, said piston containing a pilot valve which is associated with a diaphragm valve which functions with the aid of a balance between the pressure in the secondary chamber and the resilience of a pressure-regulating spring, so that when the pressure at the pressure-regulating side falls below a set value, the pilot valve will be opened in association with the action of the diaphragm valve, thereby allowing the pressure at the high pressure side to act on the rear surface of the piston to upset the balance of pressure between the piston and master valve to move the latter against the pressure acting on the rear surface thereof, thus supplying compressed air or high pressure gas from the primary chamber through the pressure supply opening to the secondary chamber until the pressure within the secondary chamber reaches a predetermined set value, whereupon the pilot valve is again closed in association with the action of the diaphragm valve to check the flow of the compressed air or high pressure gas toward the rear surface of the piston, thus allowing the assembly comprising the piston and master valve to be lifted so as to prevent the compressed air or high pressure gas from flowing into the secondary chamber.

The invention may be better understood and its numerous advantages will become apparent to those skilled in the art by reference to the accompanying drawings in which.

Figure 1:
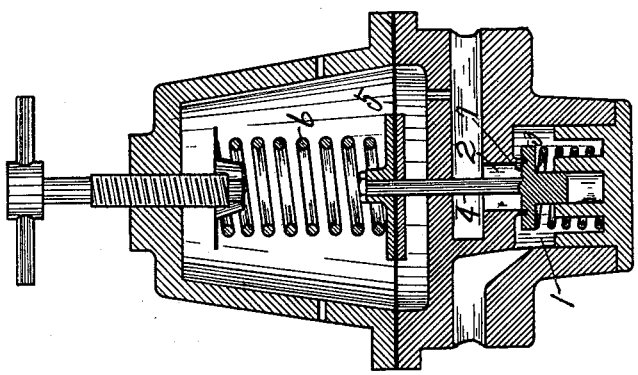
FIG. 1 is a longitudinal section of a known pressure reducing valve.

In advance of entering into explanation of the invention, the structure and function of a known pressure reducing valve will first be described with reference to FIG. 1. The opening and closing of communication between a primary chamber 1 communicating with a high pressure side and a secondary chamber 2 communicating with a pressure regulating side is controlled by a valve 3 which is connected to a diaphragm valve 5 through a rod 4 provided on the valve 3. The pressure in the secondary chamber is allowed to act on the lower surface of the diaphragm valve 5, while the spring 6 is allowed to act on the upper surface of the diaphragm valve 5. Thus, when the pressure at the pressure-regulating side, i.e., in the secondary chamber is at a set value, it overcomes the resilience of the pressure-regulating spring and urges the valve 3 against a valve seat 7 with the aid of the rod 4. On the other hand a decrease of the pressure in the secondary chamber 2 acts to cause the valve 3 to be displaced away from the valve bore 7 with the aid of the rod 4. As the result, communication between the primary and secondary chambers 1 and 2 is established, thus affording a supply of pressure to the pressure-regulating side. Meanwhile, when the pressure in the secondary chamber 2 comes to overcome the resilience of the pressure-regulating spring 6, the diaphragm valve 5 is again actuated to close the valve 3, thereby blocking the supply of pressure.

The pressure-reducing valve of the above-mentioned type, however, is disadvantageous in that since the valve 3 is connected to the diaphragm valve 5 through the rod 4, the valve is slow in motion and hence the quick opening and closing of the valve 3 in response to the movement of the diaphragm valve 5 cannot be attained, with chattering caused frequently, so that the pressure regulation, after all, tends to become inaccurate.

The present invention removes the above-mentioned drawbacks of the known pressure-reducing valve and provides improvements in such valve, the characteristic features thereof being as follows.

A pilot valve having a very small pressure-working area is associated with a diaphragm valve in such a manner that the actuation of said pilot valve causes the opening and closing of the master valve, whereby the movement of the diaphragm valve due to the variations in pressure within the secondary chamber can be sensitively picked up. Another feature is that an assembly which consists of the master valve and piston and is maintained normally in equilibrium under the pressure existing in the primary chamber at the high pressure side, is positioned in the primary chamber in such a manner that when the pressure from the high pressure side is applied to the rear surface of the piston at a predetermined time by the actuation of the pilot valve, the equilibrium of the assembly can be upset, thereby exceedingly smoothing or facilitating the movement of the master valve and thus affording a quick supply of pressure to the pressure-regulating side. A further feature is that the working areas for the pressure in the primary chamber acting on the piston and master valve constituting the assembly are equal in size to each other and directed in opposite directions so as to determine the pressure characteristics of a pressure-reducing valve by both the pressure-working area of the pilot valve and the diaphragm valve area, to decrease the pressure-working area of the pilot valve, thereby providing a pressure-reducing valve of more sensitive and better pressure characteristic. Still a further feature is that the size of a whole pressure-reducing valve is decreased by decreasing the pressure of a spring used for urging the master valve against a pressure supply opening establishing communication between the primary and secondary chambers. Yet another feature of the present invention is that there is provided a pressure-reducing valve which is simple in structure, easily disassembled by removing a valve guide member and bonnet, and allows easy repair and handling thereof.

Figure 2:
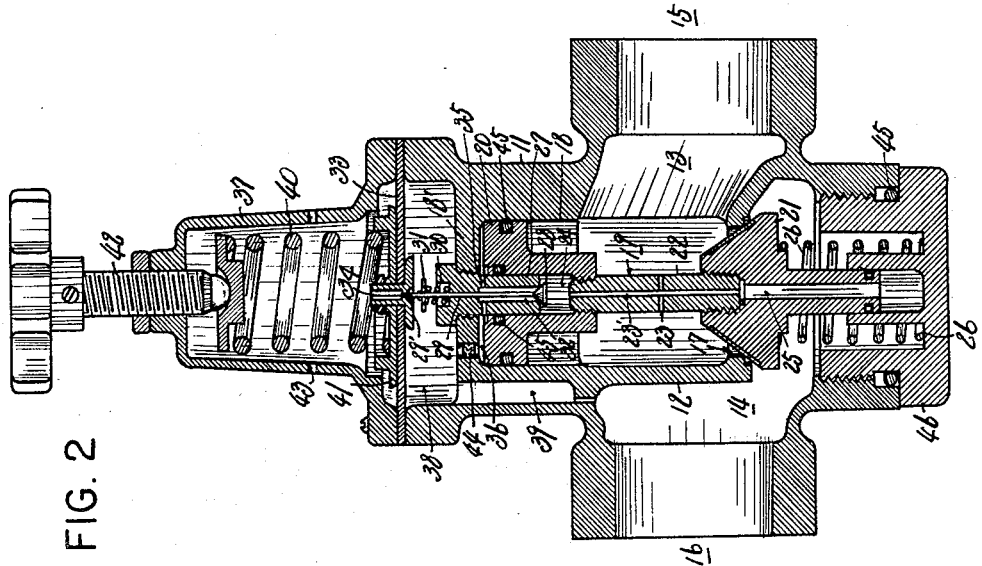
FIGS. 2 through 4 illustrate, in longitudinal section, a pilot type pressure-reducing valve according to the present invention, FIG. 2 illustrating the normal condition, FIG. 3 showing a condition in which the pressure on the pressure regulating side is lower than the set value, FIG. 4 illustrating a condition in which it is above the set value.
Figure 4:
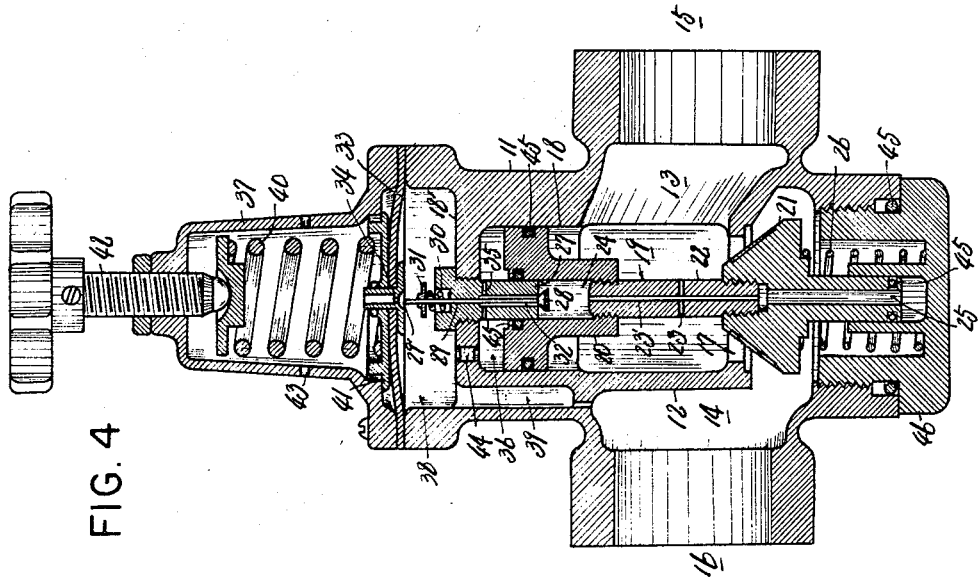
Figure 3:
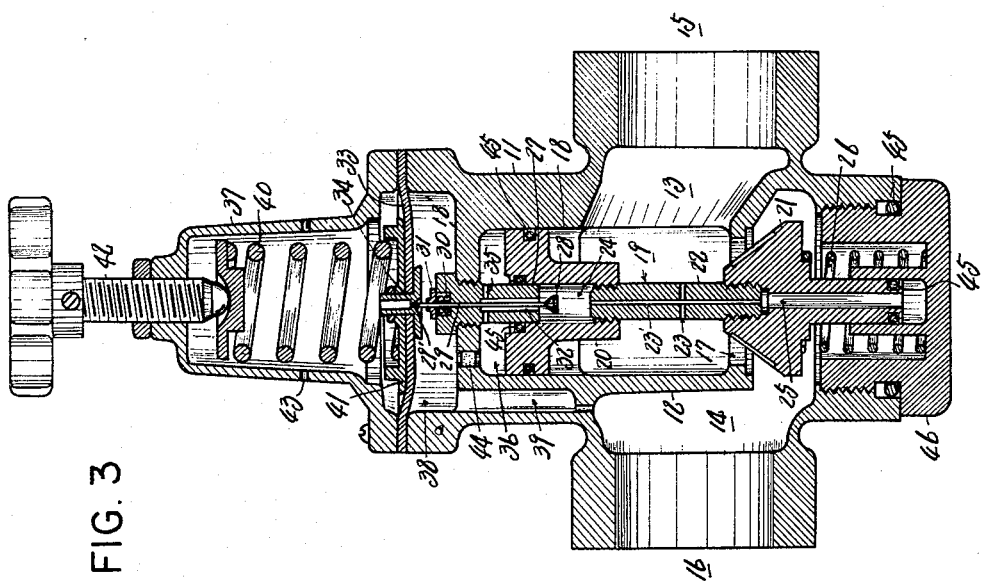

An example of the embodiment of the present invention will now be described with reference to FIGS. 2 through 4. The reference numeral 11 designates a main valve housing, which is divided by a partition wall 12 into a primary chamber 13 and a secondary chamber 14. The primary chamber communicates with a high pressure side inlet 15 connected to a pressure supply source, while the secondary chamber communicates with a pressure-regulating side outlet 16 receiving a supply of pressure. 17 designates a pressure supply or main valve opening for establishing communication between the primary and secondary chambers. The part of the primary chamber opposed to said pressure supply opening, that is, the top part thereof is integrally formed with a cylinder 18. Fitted in the primary chamber is an assembly 19 consisting of a piston 20 fitted in the cylinder, a master valve 21 for effecting the opening and closing of the pressure supply opening at a predetermined time, and a bar 22 connecting the piston and master valve to each other. The piston and master valve are threadedly fitted over the opposed ends of the bar, so that these three members form a unit body. 23 and 23' designate vent holes for the pressure in the primary chamber formed in the bar, through which vent holes the pressure in the primary chamber is conducted to an opening 24 in the piston and an opening 25 in the master valve. A spring 26 is provided in the secondary chamber for pushing up the assembly so as to urge from the secondary chamber side the frusto-conical master valve against the pressure supply opening. When the master valve has been urged against the pressure supply opening, the piston assumes a top position in the cylinder, as shown in FIG. 2. In this connection, it is so arranged that a slight clearance (minimum back chamber 36) is formed between the cylinder head 18' and piston. 27 designates a valve body secured to the central portion of the cylinder wall, the lower end thereof extending into the piston opening. A rod 29 for the pilot valve 28 extends from the lower end of the valve body upwardly therethrough, with its top end 29' emerging above the cylinder wall. A spring 30 is compressed and interposed between the valve body and a seat member secured to the rod as designated at 31, said spring normally pushing up the pilot valve to cause the latter to normally close the valve opening 32, with the top end 29' of the rod forced against a vent hole 34 formed in the central portion of a diaphragm valve 33 to close the latter, as shown in FIG. 2. The valve opening in the valve body is open to a back chamber 36 formed in the piston through a transverse hole 35. The diaphragm valve is tightly mounted between the main valve housing and a bonnet 37 and cooperates with the cylinder wall to define a diaphragm chamber 38 therebetween which is in communication with the secondary chamber through a passage 39. A pressure-regulating spring 40 is enclosed in the bonnet, acting on the diaphragm valve through an abutment plate 41 on which the lower end of said spring rests, the upper end thereof being downwardly urged by a pressure-regulating screw rod 42. 43 designates a vent hole formed in the bonnet for establishing communication between the interior of the bonnet and the atmosphere. 44 designates an element provided in the cylinder wall for allowing the gradual escape of the pressure in the back chamber of the piston to the diaphragm chamber. As such element, use is made of a metal having gas permeability, e.g., sintered metal. 45 designates ring-shaped packings for assuring airtightness. 46 designates a valve guide member secured to the lower portion of the main valve housing.

FIG. 2 shows a condition in which the pressure-regulating side 16 operates at a set value of pressure, wherein the resilience of the pressure-regulating spring and the pressure in the secondary chamber are in equilibrium with each other, while the pressure in the primary chamber is passed through the holes 23, 23' and 24 to act on the pilot valve 28 to push up the latter to close the valve opening 32, the assembly 19 being lifted by the spring 26 so that the master valve 21 blocks the pressure supply opening 17. In this condition, if the pressure at the pressure-regulating side is decreased, this is naturally followed by a decrease in pressure in the diaphragm chamber. As the result, the diaphragm valve is depressed by the pressure-regulating spring, as shown in FIG. 3. When the diaphragm valve is thus depressed, the pilot valve is thereby lowered to uncover the valve opening 32 of the valve body 27, with the result that the pressure in the primary chamber 13 flows through the holes 23, 23', 24, 32 and 35 into the back chamber 36 of the piston, thus causing the quick downward movement of the assembly against the force of the spring 26 to free the pressure supply opening from the blocking due to the master valve, thereby supplying pressure to the pressure regulating side. As the pressure at the pressure-regulating side approaches its set value, the diaphragm valve in the diaphragm chamber is gradually restored to its normal condition, during which the pilot valve is pushed up by the spring 30. As soon as the diaphragm is restored to its position shown in FIG. 2, the pilot valve closes the valve opening 32. Thus, the supply of the pressure in the primary chamber to the back chamber of the piston is interrupted. As the result, the assembly is pushed up by the resilience of the spring 26 and the pressure in the back chamber of the piston is pressed out through the element 44 into the diaphragm chamber until the condition shown in FIG. 2 is restored. That is, the supply of pressure to the secondary chamber is interrupted. In this case, however, there is a slight time lag before the master valve closes the pressure supply opening after the closure of the valve opening by the pilot valve, during which the secondary chamber is supplied with a pressure higher than the set value, whereupon the diaphragm is consequently caused to be curved upwardly against the resilience of the pressure-regulating spring, as shown in FIG. 4. However, the rod of the pilot valve has such a length as to close the vent hole of the diaphragm when the diaphragm valve is under pressure at the set value, so that when the diaphragm valve is curved by compressing the pressure-regulating spring, as shown in FIG. 4, the vent hole 34 is opened. As the result, the pressure in the secondary chamber is passed through the passage 39, chamber 38 and vent hole 34 into the bonnet, where from it is discharged through the small vent hole 43 of the bonnet into the atmosphere. Thus, the pressure in the secondary chamber is gradually decreased, so that the diaphragm is finally restored to its normal condition. The vent hole 24 is thus closed by the pilot valve rod, whereby the pressure in the secondary chamber attains the set value. In addition, the change or adjustment of the pressure in the secondary chamber, i.e., at the pressure-regulating side can be freely made by manipulating the pressure-regulating screw rod so as to change the pressing force on the diaphragm exerted by the pressure-regulating spring.

While the preferred form of the invention has been shown and described herein, it is to be understood that the same is not so limited but shall cover and include any and all modifications of the invention that fall within the purview thereof.

What is claimed is:
1. A pressure reducing valve comprising:
(a) a valve body having
(1) an inlet chamber,
(2) an outlet chamber,
(3) a partition wall therebetween, with a valve opening therethrough, and
(4) a cylinder forming an extension of said inlet chamber and positioned opposite to and in alignment with said valve opening, and having a cylinder head,
(b) a valve assembly housed in said valve body and comprising
(1) a piston slidable in said cylinder,
(2) a rod connected to said piston, and
(3) a main valve carried by said rod and positioned to open and close said valve opening,
(4) said piston being chambered and the chamber therein communicating with said inlet chamber,
(c) a back chamber formed between said piston and said cylinder head,
(d) a diaphragm chamber communicating with said outlet chamber and having a wall thereof in the form of a flexible diaphragm,
(e) a pilot valve for controlling communication between said piston chamber and said back chamber, a portion of said pilot valve extending into said diaphragm chamber for coaction with said diaphragm,
(f) adjusting means comprising spring means bearing against said diaphragm,
(g) the force of said spring means urging said diaphragm in the direction to open said pilot valve and admit fluid pressure from said piston chamber to said back chamber for opening said main valve, and the fluid pressure in said diaphragm chamber urging said diaphragm in the direction to close said pilot valve, and
(h) means for controllably releasing pressure from said back chamber for permitting closing of said main valve when said pilot valve is closed.

2. A valve according to claim 1, in which said pilot valve comprises a pilot valve body carried by said cylinder head and extending into said piston chamber in packed sliding association with said piston.

3. A valve according to claim 1, in which said means (h) comprises a restricted communication between said back chamber and said outlet chamber.

4. A valve according to claim 1, in which said diaphragm chamber is formed integrally with said valve housing and is separated from said back chamber by said cylinder head.

5. A valve according to claim 4, in which said means (h) comprises a portion of said cylinder head formed of gas permeable metal.

6. A valve according to claim 1, in which said main valve (b)(3) is provided with means for urging it from within said outlet chamber against the outlet side of the valve opening in said partition (a)(3).

7. A valve according to claim 6, in which said housing is provided with a main valve guide member with which said main valve has packed sliding engagement, and in which the packed space between said main valve and said guide member is in communication with said inlet chamber.

8. A valve according to claim 7, in which said main valve comprises a chamber communicating with said packed space, and in which said last named chamber and the chamber in said piston communicate with said inlet chamber by way of bores formed in said rod (b)(2).

9. A valve according to claim 1, in which said piston and said main valve have substantially equal areas exposed to the pressure in said inlet chamber, and in which spring means is provided engaging said main valve for moving the same toward closed position when said pilot valve is closed.

References Cited

UNITED STATES PATENTS

| 1,184,761 | 5/1916 | Lytton | 137—489.5 |
| 2,522,913 | 9/1950 | Westman | 137—116.5 |
| 2,583,006 | 1/1952 | Niesemann | 137—489.5 X |
| 2,664,674 | 1/1954 | Niesemann | 137—116.5 |
| 2,761,464 | 9/1956 | Faust | 137—116.5 |
| 3,086,548 | 4/1963 | Galiger et al. | 137—116.5 X |
| 3,357,443 | 12/1967 | Brumm | 137—116.5 |

WILLIAM F. O'DEA, Primary Examiner

D. J. ZOBKIW, Assistant Examiner

U.S. Cl. X.R.

137—116.5, 492.5; 251—39